United States Patent
Mashita et al.

(10) Patent No.: US 7,163,980 B2
(45) Date of Patent: Jan. 16, 2007

(54) RESIN COMPOSITION AND MEMBER COMPRISING SAID RESIN COMPOSITION

(75) Inventors: Naruhiko Mashita, Kanagawa (JP); Tadashi Utsunomiya, Kanagawa (JP); Youkou Saito, Kanagawa (JP)

(73) Assignee: Bridgestone Corporation, Tokyo (JP)

( * ) Notice: Subject to any disclaimer, the term of this patent is extended or adjusted under 35 U.S.C. 154(b) by 168 days.

(21) Appl. No.: 10/487,667

(22) PCT Filed: Sep. 25, 2002

(86) PCT No.: PCT/JP02/09836

§ 371 (c)(1),
(2), (4) Date: Feb. 24, 2004

(87) PCT Pub. No.: WO03/027183

PCT Pub. Date: Apr. 3, 2003

(65) Prior Publication Data

US 2004/0239735 A1  Dec. 2, 2004

(30) Foreign Application Priority Data

Sep. 25, 2001 (JP) ............................. 2001-290810
Sep. 25, 2001 (JP) ............................. 2001-290811
Sep. 25, 2001 (JP) ............................. 2001-290812
Sep. 25, 2001 (JP) ............................. 2001-290813
Sep. 25, 2001 (JP) ............................. 2001-290814

(51) Int. Cl.
*C08L 53/00* (2006.01)

(52) U.S. Cl. ...................................... 525/88

(58) Field of Classification Search .................. 347/29, 347/30, 85, 86; 523/160; 264/480; 525/88, 525/89, 240, 331.9, 333.3; 524/505
See application file for complete search history.

(56) References Cited

U.S. PATENT DOCUMENTS 4,863,997 A * 9/1989 Shibuya et al. ........... 525/92 D
5,424,360 A * 6/1995 Nagaoka et al. ............... 525/66
5,934,503 A * 8/1999 Shachi et al. ................ 221/154
6,410,109 B1 * 6/2002 Shachi et al. .............. 428/36.6
6,533,389 B1 * 3/2003 Ogawa et al. ................. 347/37
6,737,449 B1 * 5/2004 Yatake ........................ 523/160
6,824,730 B1 * 11/2004 Mashita et al. ............. 264/480

FOREIGN PATENT DOCUMENTS

| EP | 0 572 667 A1 | 9/1992 |
| EP | 0 754 743 A1 | 1/1997 |
| EP | 0 761 752 A1 | 3/1997 |
| EP | 0 853 096 A1 | 7/1998 |
| EP | 0 879 702 A2 | 11/1998 |
| EP | 1 045 174 A2 | 10/2000 |
| EP | 1 277 822 A1 | 1/2003 |
| JP | 11-246733 | 9/1999 |
| JP | 11-293083 | 10/1999 |
| JP | 11-323069 | 11/1999 |
| JP | 2000-038460 | 2/2000 |
| JP | 2000-119479 | 4/2000 |

* cited by examiner

*Primary Examiner*—Anh T. N. Vo
(74) *Attorney, Agent, or Firm*—Sughrue Mion, PLLC

(57) ABSTRACT

It is an object of the present invention to provide a resin composition which has a low hardness, is favorable in high loss properties (vibration absorbing properties) and gas permeation resistance, is excellent in injection moldability, thereby enabling itself to be injection molded with stable dimensional accuracy, and which is particularly suitable for constituting an elastic member for an ink jet printer, an insulator for a recording medium drive, a gasket for an HDD and an impact absorbing material for an HDD. The above object has been achieved with a resin composition which comprises 100 parts by weight of a thermoplastic elastomer containing an isobutylenic block copolymer composed of isobutylenic polymer blocks and aromatic vinylic polymer blocks, and 1 to 50 parts by weight of a polyolefin resin.

15 Claims, No Drawings

RESIN COMPOSITION AND MEMBER COMPRISING SAID RESIN COMPOSITION

TECHNICAL FIELD

The present invention relates to a resin composition which has a low hardness, is favorable in high loss properties (vibration absorbing properties) and gas permeation resistance, and is excellent in injection moldability, thus enabling itself to be injection molded with stable dimensional accuracy.

The present invention also relates to an elastic member for an ink jet printer, an ink tank and an ink jet printer, more particularly, to an elastic member which is used as sealing members for an ink tank valve and an ink tank in the case of an ink tank to be employed for an ink jet printer that records printed letters on a recording medium by supplying a recording head with ink, also as a sealing member for preventing ink from leaking through the recording head in the main body of an ink jet printer, which enables itself to be injection molded by means of two-color molding, and which is constituted of a material excellent in sealing properties and oil bleed properties; and at the same time pertains to an ink tank and an ink jet printer each using the aforesaid elastic member.

The present invention further relates to an insulator for a recording medium drive, more particularly, to an insulator which is endowed with desired performances such as favorable high loss properties (vibration absorbing properties) and oil preservability, low hardness, low compression set and the like, and which is favorably used for the vibration absorption of a recording medium drive such as a CD (compact disc), a CD-ROM, an optical disc and the like.

The present invention still further relates to a gasket which is used for an HDD (hard disc drive), which is favorable in gastihgtness and resistance to penetration and permeation of substances, and which is minimized in the generation of harmful gases, and also to a gasket which is integrated with a cover and is for an HDD in which the gasket used for the HDD and the cover is integrally molded.

The present invention furthermore relates to an impact absorbing material for an HDD, more particularly, to an impact absorbing material which is used for an HDD, and which is excellent in impact absorbing properties and also is minimized in the amount of gas generation.

BACKGROUND ART

A thermoplastic resin is capable of being injection molded, and is employed in a variety of fields. In order that the resin may cope with requirement characteristics varying depending on the purpose of use, it is a prevailing practice that a plurality of resins are used in combination.

It is one example of the foregoing that a rubber based resin is added to a thermoplastic resin to enhance the impact resistance thereof, and an attempt is made to use a thermoplastic elastomer composed of a block copolymer as a rubber based resin.

There is available as the thermoplastic elastomer as mentioned above, for instance, a thermoplastic elastomer composed of an isobutylenic block copolymer as disclosed in Japanese Patent Application Laid-Open Nos. 301955/1996 (Hei-8) and 246733/1999 (Hei-11). However, the resin composition in which the above-mentioned thermoplastic elastomer was used has not been always satisfactory in aspects of hardness, loss properties, gas permeation resistance, injection moldability and the like.

In addition, there are proposed an elastic member for an ink jet printer, an insulator for a recording medium drive, a gasket for an HDD and an impact absorbing material for an HDD that are each constituted of a resin composition wherein a thermoplastic elastomer is used. The above-proposed items, however, each involve a problem as described hereunder.

In the first place, the elastic member for an ink jet printer will be described. An ink jet printer has heretofore been equipped with an ink chamber which is filled in with ink, and an ink tank having an ink supply portion which supplies a recording head portion with ink. Examples of the type of the ink tank include a constitution such that ink is supplied to a recording head which is stationary attached to a carriage via a tube which is arranged in a unit so that the ink tank is freely attachable to and detachable from the unit, a constitution such that the ink tank is integrated with a recording head so that the ink tank is freely attachable to and detachable from a carriage and the like constitution.

The configuration of supplying the recording head with ink is such that water head difference is set on the recording head in the former, whereas in the latter, a negative pressure source is provided on the ink tank side.

There have been proposed in recent years, more ink tanks in the form of the latter from the aspects of miniaturization of a unit and ease of maintenance work.

Any of these ink tanks for the ink jet printers is required to be capable of satisfactorily supplying the recording head with ink which counterbalances the amount of the ink discharged from the recording head at the time of recording and at the same time, to be free from ink leakage through a discharge port at the time of non-recording.

An example of the ink tank meeting with the above-mentioned requirement is an ink tank which is integrated with a recording head in which a cartridge is freely attachable to and detachable from a carriage, and which is filled inside with an absorbing body (foam). By filling an absorbing body in an ink tank in such a manner, it is made possible to preserve ink inside the ink tank by the capillary force of the absorbing body and thus maintain stable meniscus of ink at the ink discharge portion of the recording head. It is necessary in this case that the absorbing body be filled in almost whole of the ink tank. Thus by allowing the absorbing body to hold an amount of ink some what smaller than a maximum amount thereof that can be held by the absorbing body, internal negative pressure is generated by taking advantage of the capillary force. Accordingly, even in the case where there exists mechanical input such as vibration or thermal input such as temperature variation in the recording head or the ink tank, it is made possible to minimize ink leakage through a discharge port of the recording head or a communicating portion of the ink tank to atmosphere and thereby to carry out stable ink preservation.

Nevertheless the system in which the ink tank inside is almost wholly filled with the absorbing body involves a problem that the internal negative pressure is increased, accompanying the consumption of the ink, thereby increasing the amount of ink remaining in the ink tank without being supplied to the recording head, whereby the application efficiency is deteriorated.

In order to solve the above-described problem, there is proposed an ink cartridge which is used for an ink jet recording head and which is constituted, for instance, such that the ink tank inside is separated into an ink reservoir and a hollow portion by the use of a wall equipped with a communication hole on a lower portion, an umbrella check valve is movably installed on the communication hole, the check valve is opened at the time of point when the ink pressure in the recording head is lowered so that the ink in the ink reservoir is discharged in the hollow portion and supplied to the recording head {Japanese Patent Application Laid-Open No. 231759/1987 (Sho-62)}.

Since there is no need to house an absorbing body in a cartridge according to the above-mentioned constitution, substantial amount of the ink housed in the ink tank can be increased. However, there is in general a serious problem with an umbrella check valve in that its offset is too large to accurately regulate the ink feed rate to the recording head, thereby causing variation in the ink feed rate and also deterioration of printing quality.

On the other hand, since the ink reservoir and the recording head are completely interrupted in a state of the umbrella check valve being closed, in the case where the ink in the hollow portion is volumetrically expanded by 2 to 5% approximately due to variation in environmental temperature, there is caused a problem that an increase in the pressure in the hollow portion breaks a seal between the recording head and a connection port, thus causing ink leakage; and in a state of the ink tank being integrated with the recording head, there is caused a problem that the ink tank pressure acting thereon as such makes it impossible to maintain the negative pressure therebetween, thus causing ink leakage through the recording head.

Moreover, the umbrella check valve involves such a problem that pressure difference of several tens of water gauge pressure to be kept for stable ink supply to the recording head, which is too low to close the valve, brings about a fear that it is opened in response to the ink swinging action due to carriage movement and also deterioration in printing stability.

In order to solve the problem with the ink tank equipped with the aforesaid umbrella check valve, an attempt is made, for instance, to employ an ink tank valve which is located at the position where the ink chamber and the ink supply portion are separated from each other, is moved by the pressure difference therebetween, and supplies the ink filled in the ink chamber to the recording head {Japanese Patent Application Laid-Open No. 174860/1996 (Hei-8)}.

By equipping the ink tank with the ink tank valve, it is possible to surely supply the recording head with ink, while certainly responding to slight pressure difference between the ink tank and the recording head without being influenced by the ink swinging action due to carriage movement so as to maintain negative pressure well suited for printing and at the same time, it is enabled to prevent ink from leaking through an ink supply port due to temperature variation and/or through the recording head.

There are usually used in the ink tank valve, an elastic material exemplified by an elastic material adhesively bonded to a plastic substrate and the like, in which thermosetting rubber has heretofore been generally used as the elastic material. However the thermosetting rubber involves a problem of difficulty in injection molding by two-color molding with plastics, of a high production cost for the aforesaid valve and besides, of difficulty in molding and vulcanizing a member of a desirable shape by using a material having lowered hardness.

On the other hand, ink leakage from an ink tank for replacement has hitherto been prevented by attaching a foamed elastic member such as polyurethane foam thereto at an ink supply port, but a long-term use thereof makes it impossible to hold ink as the case maybe, whereby development of an elastic member excellent in durability has eagerly been desired.

In regard to the ink jet printer, in the case of a printer being unactuated, the recording head is made to stand by at the end of the main body of the ink jet printer. In order to prevent ink from leaking through the recording head in the case of this standing by, the recording head is housed on a sealing member placed along a recess provided on the main body of the ink jet printer.

Thermosetting rubber, which is usually used as the sealing member, involves the problem same as the foregoing.

As can be seen in Japanese Patent Application Laid-Open No. 978/2000 (Hei-12), there is filed a patent application concerning an elastic member which is used for an ink jet printer and in which a styrenic elastomer is used. Examples of the styrenic elastomers described in the patent gazette include SEPS, SEBS, SBS and SIS in which soft segment is polyethylene propylene, polyethylene butylene, polybutadiene or polyisoprene. As is well known as the information on rubber materials for general purpose use, these polymers are not necessarily excellent in gas permeation or moisture permeation. Thus the polymers, when being required of lower gas permeation performance or lower moisture permeation performance, sometimes results in failure to manifest satisfactory performances.

Next, the insulator for a recording medium drive will be described.

A drive for a recording medium wherein information is written in such as a CD, CD-ROM and optical disc is equipped inside with a recording medium driving portion which records and/or reproduces the recording medium, and on which are mounted an electric motor for driving a recording medium, a pickup means for recording and/or reproducing the recording medium and the like. The motor and/or pickup means are not resistant to vibration from outside and inside in an aspect of mechanism, and hence are equipped with an insulator composed of thermoplastic rubber or the like for the purpose of insulating the vibration.

As a construction material for the above-mentioned insulator for a recording medium drive, there have hitherto been used general purpose rubber which is exemplified by silicone rubber and butyl rubber, and which has a hardness of about 20 to 50 degrees in terms of JIS A hardness; a gel; an oil damper and the like.

The above-cited rubber material, which has a loss factor not sufficiently high, has frequently brought about a cause for malfunction owing to high vibration transmission rate at around the resonance frequency and insufficient vibration insulation upon writing in on a recording medium.

For these reasons, in the case of using a rubber material as a vibration insulation material, the vibration insulation properties which could never been attained in a low frequently region have been achieved by devising the shape of the vibration insulation material, for instance, by molding the material into an intricate shape through thin wall molding or the like.

Nevertheless, the thin wall causes deterioration of strength, liability to damage upon molding and thus difficulty in enhancing productivity. Further in the case of vulcanized rubber, problems are caused in that there is a concern that sulfur as a vulcanizing agent remains and influences electronic part items, and in that silicone rubber brings about possibility of contact trouble due to low molecular weight silicone.

For the purpose of achieving vibration insulation in a low frequently region, the use of a more soft material such as a gel is taken into consideration. However there is a concern that a low hardness material is liable to deformation due to compression, is deteriorated in vibration insulation properties with the lapse of time, and allows low molecular weight components in the material to bleed out, thereby exerting adverse influence on a disc requiring vibration insulation.

Next, the gasket for an HDD will be described.

In recent years, electronic equipment such as a computer has come to have intricate circuit constitution, accompanying the progress towards a high performance and compactification, and is prone to be readily damaged even by a slight amount of dust. Accordingly, dust prevention is increasingly required in practical application, thus making it a usual practice to put a gasket on the junction surface between a box type main body incorporating the electronic equipment and a cover thereof, tighten the body and cover, and integrate the same by hermetical sealing. Further in order to simplify the handling upon use, there is frequently used a cover integrated with a gasket in which a cover and a gasket are integrated with each other.

However, owing to high densification of electronic part items, a gasket and sealing member are increasingly required that are more resistant to the permeation of dust and chemicals than conventional products and at the same time, are free form the generation of harmful outgas, namely free from chemical contamination.

Next, the impact absorbing material for an HDD will be described.

An actuator for a hard disc drive (HDD) is a device which locates the position of a magnetic head installed at the tip of the actuator which constitutes a part of a positioning mechanism for a high velocity head, and besides, records and reproduces magnetic signals on the magnetic disc by means of the above-mentioned magnetic head. The positioning of the magnetic head is put into practice by controlling the Lorentz force which is generated by a coil that is supported with a voice coil motor and an actuator through the control of electric current to be passed through the aforesaid coil.

The actuator is equipped in the vicinity thereof with a stopper mechanism termed crush stop which is intended to prevent a magnetic head and/or a head gimbals assembly from colliding with another member, falling out or being damaged in the event that a head positioning mechanism becomes uncontrollable and runaway by reason of malfunctioning or the like.

There has heretofore been prevalently employed as the above-mentioned impact absorbing material for an HDD, an elastic body composed of a thermoplastic elastomer of any of polyurethane base and polyvinyl chloride base. However, the impact absorbing material which is used for an HDD and made of the aforesaid elastic body has involved such problems as a large amount of harmful gas generation and insufficiency for use as a crush stop.

DISCLOSURE OF THE INVENTION

An object of the present invention is to provide the following under such circumstances.

(1) A resin composition which has a low hardness, is favorable in highloss properties (vibration absorbing properties) and gas permeation resistance, and is excellent in injection moldability, thereby enabling itself to be injection molded with stable dimensional accuracy, (2) An elastic member which is used for an ink jet printer, which is favorably used in particular in an ink jet printer as an ink tank valve that is installed at a position where an ink chamber and an ink supply portion are separated from each other, is moved by the pressure difference therebetween, and supplies a recording head portion with ink filled in the ink chamber, also as a sealing member that is installed at an ink supply port, and prevents ink from leaking through said port, or as a sealing member that is installed on the main body of the ink jet printer, prevents ink from leaking through the recording head, and prevents the recording head from drying, which enables itself to be injection molded by means of two-color molding, and which is constituted of a material excellent in sealing properties and oil bleed properties; an ink tank; and an ink jet printer each using the aforesaid elastic member.

(3) A gasket which is particularly well suited for use in an HDD (hard disc drive), which is favorable in gastihgtness and resistance to penetration and permeation of substances, and which is minimized in the generation of harmful gases, and also a gasket integrated with a cover.

(4) An insulator which is used for a recording medium drive, which is excellent in vibration absorption of lightweight articles, particularly in a low frequency region and in durability by virtue of the use of materials characterized by high loss properties(vibration absorbing properties), oil preservability, low hardness, low compression set and the like.

(5) An impact absorbing material which is used for an HDD, which has sufficient impact absorbing properties and which is minimized in the amount of harmful gas generation.

As a result of intensive extensive research and investigation accumulated by the present inventors in order to achieve the above-mentioned objects, it has been found that said objects can be achieved by constituting the foregoing members and materials of a resin composition in which a thermoplastic elastomer containing a specific block copolymer is blended with a specific component. Thus the present invention has been accomplished on the basis of the foregoing findings and information.

That is to say, the present invention provides the following.

1. A resin composition which comprises 100 parts by weight of a thermoplastic elastomer containing an isobutylenic block copolymer composed of isobutylenic polymer blocks and aromatic vinylic polymer blocks, and 1 to 50 parts by weight of a polyolefin resin;
2. An elastic member which is for an ink jet printer and which is constituted of the resin composition as set forth in the preceding item 1;
3. An insulator which is for a recording medium drive and which is constituted of the resin composition as set forth in the preceding item 1;
4. A gasket which is for an HDD and which is constituted of the resin composition as set forth in the preceding item 1;.
5. An impact absorbing material which is for an HDD and which is constituted of the resin composition as set forth in the preceding item 1;
6. The resin composition as set forth in the preceding item 1 wherein an aromatic vinylic compound which constitutes the aromatic vinylic polymer blocks is at least one species selected from the group consisting of styrene, α-methylstyrene and p-methylstyrene;
7. The resin composition as set forth in the preceding item 1 wherein the ratio by weight of the isobutylenic polymer blocks in the isobutylenic block copolymer to the aromatic vinylic polymer blocks therein is in the range of 60:40 to 80:20;
8. The resin composition as set forth in the preceding item 1 wherein the polyolefin resin is isotactic polypropylene or a copolymer thereof;
9. The resin composition as set forth in the preceding item 1 wherein the polyolefin resin is modified polyolefin;

10. The resin composition as set forth in the preceding item 1 wherein the thermoplastic elastomer containing an isobutylenic block copolymer contains a thermoplastic elastomer other than said elastomer in addition to said isobutylenic block copolymer;
11. The resin composition as set forth in the preceding item 1 which further comprises at most 100 parts by weight of polyphenylene ether based on 100 parts by weight of the thermoplastic elastomer containing an isobutylenic block copolymer composed of isobutylenic polymer blocks and aromatic vinylic polymer blocks;
12. The resin composition as set forth in the preceding item 1 which further comprises at most 200 parts by weight of a non-aromatic softening agent for rubber based on 100 parts by weight of the thermoplastic elastomer containing an isobutylenic block copolymer composed of isobutylenic polymer blocks and aromatic vinylic polymer blocks;
13. The resin composition as set forth in the preceding item 1 which further comprises 10 to 100 parts by weight of a petroleum base hydrocarbon resin based on 100 parts by weight of the thermoplastic elastomer containing an isobutylenic block copolymer composed of isobutylenic polymer blocks and aromatic vinylic polymer blocks;
14. The elastic member for an ink jet printer as set forth in the preceding item 2 which is installed on the main body of said ink jet printer, and is used as a sealing member;
15. An ink tank which comprises the elastic member as set forth in the preceding item 2;
16. An ink tank which comprises the elastic member as set forth in the preceding item 14;
17. An ink jet printer which comprises the elastic member as set forth in the preceding item 2;
18. An ink jet printer which comprises the elastic member as set forth in the preceding item 14;
19. A gasket integrated with a cover and is for an HDD wherein the gasket for an HDD as set forth in the preceding item 4 is molded integrally with a cover.

THE MOST PREFERRED EMBODIMENT TO CARRY OUT THE INVENTION

The isobutylenic block copolymer which constitutes the resin composition according to the present invention is composed of isobutylenic polymer blocks and aromatic vinylic polymer blocks.

The blocks, which comprise isobutylene and an aromatic vinyl compound, respectively, may each a block wherein an other component is copolymerized to the extent that the working effect of the present invention is not impaired thereby.

That is to say, the isobutylenic polymer blocks, which are each a chain composed of isobutylene as a principal component, may be each a copolymer block of isobutylene and a cationic polymerizable monomer other than isobutylene.

None the less, it is preferable that the isobutylenic polymer blocks be each a block comprising at least 60% by weight of isobutylene unit, particularly at least 80% by weight thereof. A content thereof of less than 60% by weight leads to deterioration in the balance between the physical properties and polymerization characteristics.

The cationic polymerizable monomer which is copolymerizable with isobutylene in the isobutylenic polymer blocks is exemplified, for instance, by aliphatic olefins, dienes and vinyl ethers.

Likewise, the aromatic vinylic polymer blocks, which are each a chain composed of an aromatic vinyl compound as a principal component, may be each a copolymer block of an aromatic vinyl compound and a cationic polymerizable monomer other than an aromatic vinyl compound.

None the less, it is preferable that the aromatic vinylic polymer blocks be each a block comprising at least 60% by weight of an aromatic vinyl compound unit, particularly at least 80% by weight thereof. A content thereof of less than 60% by weight leads to deterioration in the balance between the physical properties and polymerization characteristics.

Examples of the aromatic vinyl compound include styrene, α-alkyl substituted styrene such as α-methylstyrene; α-ethylstyrene; and α-methyl-p-methylstyrene, ring alkyl substituted styrene such as o-methylstyrene; m-methylstyrene; p-methylstyrene; 2,4-dimethylstyrene; ethylstyrene; 2,4,6-trimethylstyrene; o-t-butylstyrene; p-t-butylstyrene; and p-cyclohexylstyrene, ring halogenated styrene such as o-chlorostyrene; m-chlorostyrene; p-chlorostyrene; and 2-methyl-4-chlorostyrene, vinylnaphthalene derivative such as 1-vinylnaphthalene, indene derivative, and divinylbenzene. Of these, styrene, α-methylstyrene and p-methylstyrene are preferable. Any of the above-exemplified aromatic vinyl compound may be used alone or in combination with at least one other.

The cationic polymerizable monomer which is copolymerizable with aromatic vinyl compound in the isobutylenic polymer blocks is exemplified, for instance, by aliphatic olefins, dienes and vinyl ethers.

The ratio by weight of the isobutylenic polymer blocks in the isobutylenic block copolymer to the aromatic vinylic polymer blocks the rein is preferably in the range of 60:40 to 80:20 from the viewpoint of the balance among the physical properties of the resin composition to be obtained.

It is possible in the resin composition according to the present invention to use any of styrenic, olefinic, urethane based and ester based thermoplastic elastomers other than the isobutylenic block copolymer in combination therewith.

Examples of such thermoplastic elastomers include ① a block copolymer of crystalline polyethylene and ethylene/butylene-styrene random copolymer, said polyethylene being produced by hydrogenating a block copolymer of polybutadiene and butadiene-styrene random copolymer; ② a diblock copolymer of crystalline polyethylene and polystyrene; a triblock copolymer of styrene-ethylene/butylene-styrene (SEBS); a triblock copolymer of styrene-ethylene/propylene-styrene (SEPS); especially block copolymer of styrene-ethylene/butylene-styrene; block copolymer of styrene-ethylene/propylene-styrene, each being produced by hydrogenating a block copolymer of polybutadiene and polystyrene and a block copolymer of polyisoprene and polystyrene or a block copolymer of polybutadiene or ethylene-butadiene random copolymer and polystyrene.

In the case where a thermoplastic elastomer other than the isobutylenic block copolymer is used in combination therewith, the amount of said thermoplastic elastomer to be used is preferably at most 100 parts by weight based on 100 parts by weight of the isobutylenic block copolymer. (In the following description, the simple wording "thermoplastic elastomer" means to include both the single use of the isobutylenic block copolymer and the simultaneous use thereof with a thermoplastic elastomer other than the isobutylenic block copolymer).

The polyolefinic resin to be used in the resin composition according to the present invention is not specifically limited, but can be selected for use according to purpose of use and usage, and is exemplified by polyethylene, polypropylene, polybutene (especially crystalline polybutene) and the like.

Among them, isotactic polypropylene and a copolymer thereof are preferably usable, and particularly those having a melt mass flow rate (MFR) of 0.1 to 50 g/10 minutes, especially 0.5 to 30 g/10 minutes are preferably usable, wherein the MFR is measured in accordance with JIS K7210; 1999.

The polyolefin resin may contain so-called modified polyolefin resin, which is the resin produced by grafting an unsaturated carboxylic acid such as maleic acid, maleic anhydride, acrylic acid or an analogue or a polymerizable monomer bearing a hydroxy group onto the above-mentioned polyolefin resin. Examples of usable modified polyolefin resin include those available on markets under the trade names "Nuclel Series" manufactured by Mitsui Dupont Polychemical Co., Ltd.; "Umex Series" manufactured by Sanyo Kasei Co., Ltd.; "Exceller Series" manufactured by Exxon Chemical Co., Ltd.; "Polydone Series" manufactured by Uniroyal Co., Ltd.; "Admer Series" manufactured by Mitsui Chemical Industries Co., Ltd.; and the like.

The blending amount of the aforesaid polyolefin resin can be preferably selected on at most 200 parts by weight based on 100 parts by weight of the thermoplastic elastomer. The blending amount thereof, when exceeding 200 parts by weight based thereon, brings about liability to bleed out of a softening agent, thereby sometimes giving the cause for deterioration in mechanical strength of the resin composition according to the present invention. In order to assure sufficient working effect, the blending amount thereof is preferably at least one part by weight based thereon, more preferably at least 5 parts by weight. Taking into consideration the balance among various physical properties, the blending amount thereof is preferably at most 100 parts by weight based thereon, more preferably at most 50 parts by weight.

The resin composition according to the present invention may be blended as desired, with polyphenylene ether for the purpose of improving the compression set thereof, The polyphenylene ether resin to be used therefor may be selected for use from publicly well known ones, and is specifically exemplified by poly(2,6-dimethyl-1,4-phenylene ether); poly(2-methyl-6-ethyl-1,4-phenylene ether); poly(2,6-diphenyl-1,4-phenylene ether); poly(2-methyl-6-phenyl-1,4-phenylene ether); and poly(2,6-dichloro-1,4-phenylene ether). There is also usable a polyphenylene ether copolymer such as the copolymer of 2,6-dimethylphenol and a monohydric phenols(e.g. 2,3,6-trimethylpheno 1 and 2-methyl-6-butylphenol). Of these are preferable poly(2,6-dimethy 1-1,4-phenylene ether) and the copolymer of 2,6-dimethylphenol and 2,3,6-trimethylphenol, and poly(2,6-dimethyl-1,4-phenylene ether) is preferable in particular.

The blending amount of the aforesaid polyphenylene ether can be preferably selected on at most 100 parts by weight based on 100 parts by weight of the thermoplastic elastomer. The blending amount thereof, when exceeding 100 parts by weight based thereon, unfavorably gives rise to a fear of unreasonably high hardness of the thermoplastic elastomer. In order to assure sufficient working effect, the blending amount thereof is preferably at least one part by weight based thereon, more preferably at least 5 parts by weight. Taking into consideration the balance among various physical properties, the blending amount thereof is preferably at most 75 parts by weight based thereon, more preferably at most 50 parts by weight.

The resin composition according to the present invention may be blended with a non-aromatic rubber-softening agent for the purpose of lowering the hardness of the thermoplastic elastomer. From the viewpoint of physical properties, the non-aromatic rubber-softening agent has a viscosity at 100° C. of preferably at most $5\times10^5$ centipoise, particularly at most $1\times10^5$ centipoise. From the viewpoint of molecular weight, the softening agent has a number average molecular weight of at most 20,000, preferably at most 10,000, more preferably at most 5,000. In particular, such non-aromatic rubber-softening agent is preferably any of paraffin base oil of mineral oil base, naphthene base oil and synthetic polyisobutylene base oil each having a number average molecular weight in the range of 450 to 5,000. The softening agent may be used alone or in combination with at least one other provided that they are favorably compatible with one another.

The blending amount of the aforesaid softening agent can be preferably selected on at most 200 parts by weight based on 100 parts by weight of the thermoplastic elastomer. The blending amount thereof, when exceeding 200 parts by weight based thereon, brings about liability to bleed out of a softening agent, thereby sometimes giving the cause for deterioration in mechanical strength of the resin composition according to the present invention. In order to assure sufficient working effect, the blending amount thereof is preferably selected in the above-mentioned range according to the molecular weight of the thermoplastic elastomer and the types of other components to be added to the elastomer.

The resin composition according to the present invention may be blended with a petroleum base hydrocarbon resin for the purpose of shifting a dielectric loss constant (tan δ) to the working temperature region of objective purpose of use and/or improving high loss properties. Such petroleum base hydrocarbon resin is exemplified by an aromatic hydrocarbon resin, an aliphatic hydrocarbon resin and the like. The blending amount thereof is preferably in the range of 10 to 100 parts by weight based on 100 parts by weight of the thermoplastic elastomer. The blending amount thereof, when being less than 10 parts by weight based thereon, sometimes results in that the working effect is not sufficiently exhibited, whereas the amount, when being more than 100 parts by weight based thereon, sometimes brings about unreasonably large creep, thus making the resin molded article unusable owing to excessive deformation.

In addition thereto, the resin composition according to the present invention may be blended with an inorganic filler such as clay, diatomaceous earth, silica, talc, barium sulfate, calcium carbonate, magnesium carbonate, a metal oxide, mica, graphite and aluminum hydroxide, various metal powders, glass powder, ceramics powder, granular or powdery solid filler such as granular or powdery polymer, and a variety of natural or artificial short fibers and long fibers (such as a variety of polymer fibers). The inorganic filler is preferably in the form of flake.

Moreover, the resin composition according to the present invention may be incorporated inside with bubbles, which is directed to lightweightness.

A method for incorporating bubbles is not specifically limited, but is exemplified by a method in which an inorganic hollow filler such as glass balloon and silica balloon, or an organic hollow filler such as polyfluorinated vinylidene and polyfluorinated vinylidene copolymer is blended; a method in which any of various foaming agents is mixed; a method in which a gas is mechanically incorporated upon mixing; and the like method.

It is possible at need to use simultaneously with the composition, such additive as flame retardants, antimicrobial agents, hindered a mine base light stabilizer, ultraviolet rays absorbers, antioxidants, colorants, silicone oil, silicone polymer, coumarone resin, coumarone indene resin, phenol terpene resin, petroleum base hydrocarbon, various tackifying agent such as rosin derivative, various adhesive elastomer such as Rheostomer B (trade name, manufactured by Riken Vinyl Co., Ltd.) and the like.

The process for producing the resin composition according to the present invention is not specifically limited, but well known processes are applicable thereto.

For instance, the resin composition is readily producible by a process which comprises the steps of melt kneading each of the above-mentioned components and the additive components to be used as desired by the use of a heating kneader such as a single screw extruder, a twin screw extruder, a roll, a Banbury mixer, a Brabender, a kneader and a high shear type mixer; further adding as desired to the resultant mixture, a cross-linking agent such as an organic peroxide, a cross-linking aid or the like, or simultaneously mixing with the necessary components; and melt kneading by heating the resultant mixture.

It is also possible to produce the resin composition by preparing in advance, a resin composition in which a high molecular organic material and a softening agent have been kneaded, and mixing the composition thus prepared with at least one high molecular organic material whose type is same as or different from that used here.

Further, the resin composition according to the present invention can be cross-linked by adding thereto, a cross-linking agent such as an organic peroxide, a cross-linking aid and the like.

As described hereinbefore, the resin composition according to the present invention is particularly well suited for constituting an elastic member for an ink jet printer, an insulator for a recording medium drive, a gasket for an HDD and an impact absorbing material for an HDD.

As a consequence, the elastic member for an ink jet printer, insulator for a recording medium drive, gasket for an HDD and impact absorbing material for an HDD according to the present invention have overcome and eliminated the problems as described hereinabove.

The elastic member according to the present invention which is for an ink jet printer and which is constituted of the resin composition according to the present invention is favorably used for an ink tank in an ink jet printer which tank comprises an ink chamber filled in with ink and an ink supply portion supplying a recording head with ink.

The elastic member is not specifically limited provided that it is a part item requiring an elastic member in the aforesaid ink tank, and thus is usable for any of part items. It is favorable in particular to use the same in an ink jet printer as an ink tank valve that is installed at a position where an ink chamber and an ink supply portion are separated from each other, is moved by the pressure difference therebetween, and supplies a recording head portion with ink filled in the ink chamber, also as a sealing member that is installed at an ink supply port, and prevents ink from leaking through said port.

By applying to the elastic member, the resin composition according to the present invention which contains the isobutylenic block copolymer, the working effect is exhibited as described hereunder.

The above-mentioned ink tank valve is, for instance, of such a structure that an elastic member is integrally formed on the surface of a plastic-made substrate, and in the case of producing a molded article having such structure it is advantageous to adopt injection molding method by means of two-color molding which method is simple in production process and low in production cost. Although the thermosetting rubber which has hitherto been used as the aforesaid elastic member is difficult to produce by two-color molding with a plastic, the use of the material comprising the isobutylenic block copolymer according to the present invention facilitates two-color molding thus enabling to produce the ink tank valve at a low cost.

Moreover although it has been difficult for the conventional thermosetting rubber to mold and vulcanize a low hardness material into a member having a desirable form, the use of the material comprising the isobutylenic block copolymer according to the present invention surmounts the difficulty, thus enabling to produce a molded article having moderate elasticity and excellent mechanical and physical properties.

Further it is made possible by the present invention to use a liquid such as paraffin base oil having polarity much different from that of ink, as an oil component to be used in the case of lowering the hardness of a thermoplastic elastomer such as isobutylenic block copolymer in the resin composition and besides, the oil is less liable to be compatible with styrene block which is an aggregation domain of the isobutylenic block copolymer, thus exerting less influence on the physical properties such as the strength of the elastomer.

Still further it is made possible by the use of the thermoplastic elastomer comprising the isobutylenic block copolymer to obtain an ink tank valve which is minimized in change including swelling due to a solvent such as ink and is excellent in durability; a sealing member for an ink tank; a sealing member for preventing ink from leaking through a recording head; and the like.

The sealing member according to the present invention not only can be installed at an ink supply port, but also can be used at a junction connecting between an ink supply portion and a recording head.

The ink tank according to the present invention is not specifically limited provided that the above-mentioned elastic member is used therefor. It may be packed with a foam such as polyurethane foam to hold ink, or may not be packed with a foam.

The shapes of the aforesaid ink tank valve and the sealing member for the ink tank are not specifically limited, but are exemplified by the shapes same as those having heretofore been used in ink tanks. As methods for the production thereof, for instance in the case of the sealing member for the ink tank, there are adoptable publicly well known methods including injection molding, extrusion molding and the like. In the case of the ink tank valve, a two-color molding method is adoptable which comprises melt injection molding plastics as a base material into a mold, and subsequently melt injection molding the resin composition according to the present invention thereon to integrally laminate the resin composition on the surface of the molded plastics article. Alternatively, an insert molding method is also adoptable which comprises melt injection molding plastics into a mold, subsequently inserting the resultant molded article into an other mold, and melt injection molding the resin composition according to the present invention thereon to integrally laminate the resin composition on the surface of the molded plastics article.

The insulator for a recording medium drive according to the present invention is produced by molding the resin composition according to the present invention into a desirable form by a well known method such as injection molding. The insulator is favorably usable for acoustic equipment, information-related equipment, information transfer equipment, game-related equipment and the like, more specifically, CD player, insulator for car mounted CD, insulators for hard disc drive and floppy disc drive, various personal computer, insulators for CD-ROM used in domestic game equipment and various instruments.

The gasket for an HDD according to the present invention is produced by molding the resin composition according to the present invention into a desirable form by a well known method such as injection molding. It is used as a gasket, a gasket integrated with a cover by integrally molding the same with a cover.

As the cover in a gasket integrated with a cover, there is usable a rigid resin cover, but a metallic cover is preferable from processability and the like. The metal to be used is not specifically limited, but may be properly optionally selected for use from cold rolled steel sheets, galvanized steel sheets, aluminum/zinc alloy plated steel sheets, stainless steel sheets, aluminum sheets, aluminum alloy sheets, magnesium sheets and magnesium alloy sheets. Injection molded magnesium sheets are also usable. There are preferably usable metallic sheets which are treated with non-electrolytic nickel plating for its excellent corrosion resistance. As a method for non-electrolytic nickel plating, there is usable any of publicly well known methods that have heretofore been applied to metallic raw materials, for instance, a method which comprises immersing a metallic sheet to be treated in a non-electrolytic nickel plating bath comprising an aqueous solution at a pH of approximately 4.0 to 5.0 and at a temperature of approximately 85 to 95° C. which contains nickel sulfate, sodium hypochlorite, lactic acid, propionic acid and the like each in a proper proportion. The thickness of the cover, which is properly optionally selected, is in the range of usually 0.3 to 1.0 mm, preferably 0.4 to 0.6 mm.

The impact absorbing material for a HDD according to the present invention is produced by molding the resin composition according to the present invention into a desirable form by a well known method such as injection molding, and is used, for instance, as a crush stop.

In this connection, priority is claimed by the present patent application on the basis of Japanese Patent Application Nos. 290810/2001 (Hei 13), 290811/2001, 290812/2001, 290813/2001 and 290810/2001, the citations of which are made by the present application in whole.

In what follows, the present invention will be described in more detail with reference to working examples, which however shall never limit the present invention thereto.

Evaluations were made of the physical properties in the following working examples, comparative examples and reference examples by the methods as described hereunder.

(1) Hardness

Hardness was measured in accordance with JIS K 6301-1993, and the measurement results were indicated in terms of relative value based on 100 as the relative hardness in Comparative Example 1.

(2) Tan δ

Dielectric loss tangent tan δ was measured at 25° C., 15 Hz, 1% strain, and the measurement results were indicated in terms of relative value based on 100 as the relative tan δ in Comparative Example 1.

(3) Injection Moldability

Injection moldability was evaluated by two marks including ○; moldable within an accuracy of ±1%, X; non-moldable.

(4) Oil Bleed Property

Oil bleed property was evaluated by immersing elastic member specimen in ink, and the specimen was checked for bleed out at 70° C. for 24 hours.

(5) Sealability

Sealability was evaluated by installing a sealing member specimen prepared under preparation conditions of mold temperature of 80° C. and resin temperature of 70° C. on an ink tank, applying it to an ink jet printer for use at 25° C. for one month, and checking the same for leakage therethrough.

(6) Vibration Absorbing Property

Vibration absorbing property was evaluated by incorporating an insulator specimen prepared from the resin composition in a marketed CD-ROM startup apparatus, operating the apparatus, and measuring the vibration transmission factor onto the installation floor, and the measurement results were indicated in terms of relative value based on 100 as the vibration transmission factor in Comparative Example 1.

(7) Amount of Gas Generation

Amount of gas generated from 10 mg of the resin composition at 150° C. for 20 minutes was measured by the use of a GC-MS, and the measurement results were indicated in terms of relative value based on 100 as the relative amount of gas generation in Comparative Examples 7 and 9 (same blending proportion).

(8) Gas Permeability

Gas permeability was evaluated by measuring permeation rate of cyclic dimethylsiloxane (D4) at 60° C. for 24 hours through a sheet made of the resin composition measuring 2 mm in thickness and 5 cm square, and the measurement results were indicated in terms of relative value based on 100 as the relative amount of gas permeability in Comparative Example 7.

(9) Impact Absorbing Property

An iron ball with one kg of weight was dropped onto a sheet made of the resin composition measuring 2 mm in thickness and 5 cm square from a position at a height of one meter, and the rebound height of the ball was measured to evaluate the impact absorbing property by two marks including X; 2 cm or more (including unmeasurable case), and ○; less than 2 cm.

The blending raw materials in the following working examples, comparative examples and reference examples are each described hereunder.

Polymer A: styrene-isobutene-styrene block copolymer (styrene content: 30% by weight)

Polymer B: styrene-ethylene/butylene-styrene block copolymer (manufactured by Krayton Polymer Co., Ltd. under the trade name "krayton G 16 50", styrene content: 30% by weight)

Polymer C: polypropylene (manufactured by Chisso Corporation under the trade name "Polypro CF 3031")

Polymer D: modified polyphenylene ether (manufactured by Asahi Chemical Industry Co., Ltd., under the trade name "Zailon X 0108").

Polymer E: aromatic petroleum based hydrocarbon resin (manufactured by Shin-Nippon Oil Co., Ltd., under the trade name "Nisseki Neopolymer 120").

Polymer F: uretahne rubber (manufactured by Kuraray Co., Ltd., under the trade name "Kuramiron U")

Oil A: liquid polybutene (manufactured by Nisseki Chemical Co., Ltd., under the trade name "HV 100")

Oil B: paraffin base oil (manufactured by Mitsui Chemical Co., Ltd., under the trade name "Lucant HC-150")
Oil C: paraffin base oil (manufactured by Idemitsu Kosan Co., Ltd., under the trade name "Diana Process Oil PW 380")

EXAMPLES 1 TO 5 AND COMPARATIVE EXAMPLES 1 AND 2

Samples of resin compositions were prepared by sufficiently kneading each of the components having blending composition as given on Table 1, and the physical properties thereof were evaluated. As the results, as is clear from Table 1, the resin compositions in Examples 1 to 5 are excellent in low hardness, high loss properties (vibration absorption properties) and further in injection moldability, and have each low gas permeability, thus enabling injection molding with stable dimensional accuracy.

TABLE 1

|  | Example |  |  |  |  | Comparative Example |  |
|---|---|---|---|---|---|---|---|
|  | 1 | 2 | 3 | 4 | 5 | 1 | 2 |
| BLENDUG PROPRTION (parts by weight) | | | | | | | |
| Polymer A | 100 | 100 | 100 | 100 | 50 |  | 100 |
| Polymer B |  |  |  |  | 50 | 100 |  |
| Polymer C | 15 | 15 | 15 | 7.5 | 7.5 | 15 |  |
| Polymer D |  |  |  | 7.5 | 7.5 |  |  |
| Oil A | 150 |  |  | 150 | 7.5 | 150 | 150 |
| Oil B |  | 150 |  |  |  |  |  |
| Oil C |  |  | 150 |  | 75 |  |  |
| EVALUATION | | | | | | | |
| hardness | 60 | 60 | 60 | 70 | 70 | 100 | 85 |
| Tan δ | 10 | 8 | 6 | 6 | 5 | 1 | 1.2 |
| Injection moldability | ○ | ○ | ○ | ○ | ○ | ○ | X |

EXAMPLES 6 TO 10 AND COMPARATIVE EXAMPLES 3 AND 4

Samples of resin compositions were prepared by sufficiently kneading each of the components having blending composition as given on Table 2, and evaluations were made of the physical properties (oil bleed properties and sealing properties) thereof that were required of the elastic member for an ink jet printer.

As the results, as is clear from Table 2, no oil bleed nor leakage through a seal was observed in the resin compositions in Examples 6 to 10, while both oil bleed and leakage through a seal were observed in the resin compositions in Comparative Examples.

TABLE 2

|  | Example |  |  |  |  | Comparative Example |  |
|---|---|---|---|---|---|---|---|
|  | 6 | 7 | 8 | 9 | 10 | 3 | 4 |
| BLENDUG PROPRTION (parts by weight) | | | | | | | |
| Polymer A | 100 | 100 | 100 | 50 | 50 |  |  |
| Polymer B |  |  |  | 50 | 50 | 100 | 100 |
| Polymer C | 15 | 15 | 15 | 15 | 15 | 15 | 15 |
| Polymer D | 5 |  | 10 | 15 | 15 | 15 | 15 |
| Oil A | 150 |  |  | 75 | 7.5 | 150 |  |
| Oil B |  | 150 |  | 75 |  |  | 150 |
| Oil C |  |  | 150 |  | 75 |  |  |
| EVALUATION | | | | | | | |
| Oil bleed properties | none | none | none | none | none | yes | yes |
| Seal leakage | none | none | none | none | none | yes | yes |

EXAMPLES 11 TO 16 AND COMPARATIVE EXAMPLES 5 AND 6

Samples of resin compositions were prepared by sufficiently kneading each of the components having blending composition as given on Table 3, and evaluations were made of the physical properties (oil bleed properties and vibration absorption properties: vibration absorptivity) thereof that were required of the insulator for an recording medium drive.

As the results, as is clear from Table 3, in the resin compositions in Examples 11 to 16 no oil bleed was observed and vibration absorption properties were superior to those of Comparative Examples, while oil bleed was observed in the resin compositions in Comparative Examples.

TABLE 3

|  | Example |  |  |  |  |  | Comparative Example |  |
|---|---|---|---|---|---|---|---|---|
|  | 11 | 12 | 13 | 14 | 15 | 16 | 5 | 6 |
| BLENDUG PROPRTION (parts by weight) | | | | | | | | |
| Polymer A | 100 | 100 | 100 | 50 | 50 | 100 |  |  |
| Polymer B |  |  |  | 50 | 50 |  | 100 | 100 |
| Polymer C | 15 | 15 | 15 | 15 | 15 |  | 15 | 15 |
| Polymer D | 5 |  | 10 | 15 | 15 |  | 15 | 15 |
| Polymer E |  |  |  |  |  | 50 | 150 |  |
| Oil A | 150 |  |  | 75 | 75 |  |  | 150 |

TABLE 3-continued

|  | Example | | | | | | Comparative Example | |
|---|---|---|---|---|---|---|---|---|
|  | 11 | 12 | 13 | 14 | 15 | 16 | 5 | 6 |
| Oil B |  | 120 |  | 75 |  |  |  | 150 |
| Oil C |  |  | 100 |  | 75 | 100 |  |  |
| EVALUATION | | | | | | | | |
| Oil bleed properties | none | none | none | none | none | none | yes | yes |
| Vibration absorbing property | 45 | 40 | 50 | 75 | 75 | 35 | 100 | 100 |

EXAMPLES 17 TO 21 AND COMPARATIVE EXAMPLES 7 AND 8

Samples of resin compositions were prepared by sufficiently kneading each of the components having blending composition as given on Table 4, and evaluations were made of the physical properties (amount of gas generation/gas permeability) thereof that were required of the gasket for an HDD.

As the results, as is clear from Table 4, in the resin compositions in Examples 17 to 21 there were observed low gas generation and low gas permeability more excellent than those in Comparative Example 7 (urethane rubber).

TABLE 4

|  | Example | | | | | Comparative Example | |
|---|---|---|---|---|---|---|---|
|  | 17 | 18 | 19 | 20 | 21 | 7 | 8 |
| BLENDUG PROPRTION (parts by weight) | | | | | | | |
| Polymer A | 100 | 100 | 100 | 50 | 50 |  |  |
| Polymer B |  |  |  | 50 | 50 |  | 100 |
| Polymer C | 15 | 15 | 15 | 15 | 15 |  | 15 |
| Polymer D | 5 |  | 10 | 15 | 15 |  | 15 |
| Polymer F |  |  |  |  |  | 100 |  |
| Oil A | 150 |  |  | 75 | 75 |  |  |
| Oil B |  | 150 |  | 75 |  |  | 150 |
| EVALUATION | | | | | | | |
| Amount of gas generation | 30 | 20 | 25 | 25 | 25 | 100 | 30 |
| Gas permeability | 10 | 10 | 10 | 75 | 75 | 100 | 100 |

EXAMPLES 22 TO 26 AND COMPARATIVE EXAMPLES 9 AND 10

Samples of resin compositions were prepared by sufficiently kneading each of the components having blending composition as given on Table 5, and evaluations were made of the physical properties (amount of gas generation and impact absorbing properties) thereof that were required of the impact absorbing material for an HDD.

As the results, as is clear from Table 5, in the resin compositions in Examples 22 to 26 there were observed low gas generation and high impact absorbing properties more excellent than those in Comparative Example 9 (urethane rubber).

TABLE 5

|  | Example | | | | | Comparative Example | |
|---|---|---|---|---|---|---|---|
|  | 22 | 23 | 24 | 25 | 26 | 9 | 10 |
| BLENDUG PROPRTION (parts by weight) | | | | | | | |
| Polymer A | 100 | 100 | 100 | 50 | 50 |  |  |
| Polymer B |  |  |  | 50 | 50 |  | 100 |
| Polymer C | 15 | 15 | 15 | 15 | 15 |  | 15 |
| Polymer D | 5 |  | 10 | 15 | 15 |  | 15 |
| Polymer F |  |  |  |  |  | 100 |  |
| Oil A | 150 |  |  | 75 | 75 |  |  |
| Oil B |  | 150 |  | 75 |  |  | 150 |
| EVALUATION | | | | | | | |
| Amount of gas generation | 50 | 40 | 50 | 50 | 40 | 100 | 50 |
| Impact absorbing property | ◯ | ◯ | ◯ | ◯ | ◯ | ◯ | X |

INDUSTRIAL APPLICABILITY

According the present invention, it is made possible to provide a resin composition which has a low hardness, is favorable in high loss properties (vibration absorbing properties) and gas permeation resistance, and is excellent in injection moldability, thereby enabling itself to be injection molded with stable dimensional accuracy. This resin composition according to the present invention is particularly suitable for constituting an elastic member for an ink jet printer, an insulator for a recording medium drive, a gasket for an HDD and an impact absorbing material for an HDD.

The elastic member for an ink jet printer according to the present invention enables itself to be injection molded by means of two-color molding with plastics; has sealing properties comparable to those of isobutylene; is excellent in sealing properties and oil bleed properties even with a comparatively small amount of added oil and low hardness; is favorably used in particular in an ink jet printer as an ink tank valve that is installed at a position where an ink chamber and an ink supply portion are separated from each other, is moved by the pressure difference therebetween, and supplies a recording head portion with ink filled in the ink chamber, also as a sealing member that is installed at an ink supply port, and prevents ink from leaking through said port, or as a sealing member that is installed on the main body of the ink jet printer, and prevents ink from leaking through the recording head; and further is effectively usable as a sealing member for a junction or the like which connects an ink supply portion and a recording head.

The insulator for a recording medium drive according to the present invention exhibits such working effects as being excellent in vibration absorbing properties of lightweight articles, particularly in vibration absorbing properties in a low frequency region and in durability by virtue of the use of materials characterized by high loss properties (vibration absorbing properties), favorable oil preservability, low hardness, low compression set and the like.

The gasket for an HDD according to the present invention, which is favorable in gastihgtness and resistance to penetration and permeation of substances and which is minimized in the generation of harmful gases, is particularly well suited for a hard disc drive.

The impact absorbing material according to the present invention, which is minimized in the amount of gas generation and which has sufficiently high impact absorbing properties, is favorably usable as a crush stopper which is minimized in the displacement due to the impact from a stopper arm.

The invention claimed is:

1. A resin composition which comprises 100 parts by weight of a thermoplastic elastomer containing an isobutylenic block copolymer composed of isobutylenic polymer blocks and aromatic vinylic polymer blocks, 1 to 50 parts by weight of a polyolefin resin, and at most 200 parts by weight of a liquid polybutene.

2. An elastic member which is for an ink jet printer and which is constituted of the resin composition as set forth in claim 1.

3. An ink tank which comprises the elastic member as set forth in claim 2.

4. The elastic member for an ink jet printer according to claim 2 which is installed on the main body of said ink jet printer, and is used as a sealing member.

5. An ink tank which comprises the elastic member as set forth in claim 4.

6. The resin composition according to claim 1 wherein an aromatic vinylic compound which constitutes the aromatic vinylic polymer block is at least one species selected from the group consisting of styrene, α-methylstyrene and p-methylstyrene.

7. The resin composition according to claim 1 wherein the ratio by weight of the isobutylenic polymer blocks in the isobutylenic block copolymer to the aromatic vinylic polymer blocks therein is in the range of 60:40 to 80:20.

8. The resin composition according to claim 1 wherein the polyolefin resin is isotactic polypropylene or a copolymer thereof.

9. The resin composition according to claim 1 wherein the polyolefin resin is modified polyolefin.

10. The resin composition according to claim 1 wherein the thermoplastic elastomer containing an isobutylenic block copolymer contains a thermoplastic elastomer other than said elastomer in addition to said isobutylenic block copolymer.

11. The resin composition according to claim 1 which further comprises at most 100 parts by weight of polyphenylene ether based on 100 parts by weight of the thermoplastic elastomer containing an isobutylenic block copolymer composed of isobutylenic polymer block and aromatic vinylic polymer blocks.

12. The resin composition according to claim 1 which further comprises at most 200 parts by weight of a non-aromatic softening agent for rubber based on 100 parts by weight of the thermoplastic elastomer containing an isobutylenic block copolymer composed of isobutylenic polymer blocks and aromatic vinylic polymer blocks.

13. The resin composition according to claim 1 which further comprises 10 to 100 parts by weight of a petroleum base hydrocarbon resin based on 100 parts by weight of the thermoplastic elastomer containing an isobutylenic block copolymer composed of isobutylenic polymer blocks and aromatic vinylic polymer blocks.

14. An ink jet printer comprising an elastic member which is constituted of a resin composition, wherein the resin composition comprises 100 parts by weight of a thermoplastic elastomer containing an isobutylenic block copolymer composed of isobutylenic polymer blocks and aromatic vinylic polymer blocks, 1 to 50 parts by weight of a polyolefin resin and at most 200 parts by weight of a liquid polybutene.

15. An ink jet printer comprising a sealing member which is installed on the main body of said ink jet printer, wherein the sealing member is constituted of a resin composition, wherein the resin composition comprises 100 parts by weight of a thermoplastic elastomer containing an isobutylenic block copolymer composed of isobutylenic polymer blocks and aromatic vinylic polymer blocks, 1 to 50 parts by weight of a polyolefin resin and at most 200 parts by weight of a liquid polybutene.

* * * * *